US008177627B2

(12) United States Patent
Baerlocher

(10) Patent No.: US 8,177,627 B2

(45) Date of Patent: May 15, 2012

(54) GAMING DEVICE AND METHOD HAVING PURCHASABLE ENHANCED PAYTABLES

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 163 days.

(21) Appl. No.: 12/816,129

(22) Filed: Jun. 15, 2010

(65) Prior Publication Data

US 2010/0267441 A1 Oct. 21, 2010

Related U.S. Application Data

(63) Continuation of application No. 11/557,843, filed on Nov. 8, 2006, now Pat. No. 7,846,018.

(51) Int. Cl.
*G06F 17/00* (2006.01)

(52) U.S. Cl. ........................................................ 463/20

(58) Field of Classification Search ............... 463/16–25
See application file for complete search history.

(56) References Cited

U.S. PATENT DOCUMENTS

| | | | |
|---|---|---|---|
| 3,628,259 | A | 12/1971 | Kahn |
| 4,156,976 | A | 6/1979 | Mikun |
| 4,621,814 | A | 11/1986 | Stepan et al. |
| 4,624,459 | A | 11/1986 | Kaufman |
| 4,669,731 | A | 6/1987 | Clarke |
| 4,695,053 | A | 9/1987 | Vazquez, Jr. et al. |
| 4,743,022 | A | 5/1988 | Wood |
| 4,805,907 | A | 2/1989 | Hagiwara |
| 4,838,552 | A | 6/1989 | Hagiwara |
| 4,991,848 | A | 2/1991 | Greenwood et al. |
| 5,011,159 | A | 4/1991 | Fortunato et al. |
| 5,019,973 | A | 5/1991 | Wilcox et al. |
| 5,088,737 | A | 2/1992 | Frank et al. |
| 5,116,055 | A | 5/1992 | Tracy |
| 5,123,649 | A | 6/1992 | Tiberio |
| 5,167,413 | A | 12/1992 | Fulton |
| 5,224,706 | A | 7/1993 | Bridgeman et al. |

(Continued)

FOREIGN PATENT DOCUMENTS

AU 771847 3/2001

(Continued)

OTHER PUBLICATIONS

"A Salute to Game Shows," The Price is Right—Pricing Games, printed from schuminweb.com/game-shows/shows/price-is-right/pricing-games.htm on Mar. 16, 2001.

(Continued)

*Primary Examiner* — Pierre E Elisca

(74) *Attorney, Agent, or Firm* — K&L Gates LLP

(57) ABSTRACT

An apparatus and method for a game having a paytable selection feature which may be implemented with a primary or base game, a secondary or bonus game, or both. In one embodiment, the gaming device employs an initial paytable and enables a player pay a fee to purchase a different paytable for a plurality of plays of the game. If the player chooses to purchase a different paytable, the gaming device determines a game outcome for a plurality of plays of the game and provides any awards based on the different paytable. If the player does not choose to select a different paytable, the gaming device determines a game outcome for each of those plays and provides any awards based on the initial paytable. In one embodiment, the player has the opportunity to see the different paytable prior to paying the fee to purchase it.

25 Claims, 9 Drawing Sheets

U.S. PATENT DOCUMENTS

| | | | |
|---|---|---|---|
| 5,248,142 | A | 9/1993 | Breeding |
| 5,294,120 | A | 3/1994 | Schultz |
| 5,294,128 | A | 3/1994 | Marquez |
| 5,342,047 | A | 8/1994 | Heidel et al. |
| 5,344,144 | A | 9/1994 | Canon |
| 5,356,140 | A | 10/1994 | Dabrowski et al. |
| 5,375,830 | A | 12/1994 | Takemoto et al. |
| 5,377,973 | A | 1/1995 | Jones et al. |
| 5,393,067 | A | 2/1995 | Paulsen et al. |
| 5,397,125 | A | 3/1995 | Adams |
| 5,401,023 | A | 3/1995 | Wood |
| 5,415,404 | A | 5/1995 | Joshi et al. |
| 5,489,101 | A | 2/1996 | Moody |
| 5,511,781 | A | 4/1996 | Wood et al. |
| 5,531,448 | A | 7/1996 | Moody |
| 5,542,669 | A | 8/1996 | Charron et al. |
| 5,570,885 | A | 11/1996 | Ornstein |
| 5,580,055 | A | 12/1996 | Hagiwara |
| 5,584,486 | A | 12/1996 | Franklin |
| 5,584,764 | A | 12/1996 | Inoue |
| 5,593,161 | A | 1/1997 | Boylan et al. |
| 5,611,535 | A | 3/1997 | Tiberio |
| 5,645,485 | A | 7/1997 | Clapper, Jr. |
| 5,678,001 | A | 10/1997 | Nagel et al. |
| 5,707,285 | A | 1/1998 | Place et al. |
| 5,711,715 | A | 1/1998 | Ringo et al. |
| 5,718,431 | A | 2/1998 | Ornstein |
| 5,720,662 | A | 2/1998 | Holmes, Jr. et al. |
| 5,722,891 | A | 3/1998 | Inoue |
| 5,732,950 | A | 3/1998 | Moody |
| 5,766,074 | A | 6/1998 | Cannon et al. |
| 5,769,716 | A | 6/1998 | Saffari et al. |
| 5,772,509 | A | 6/1998 | Weiss |
| 5,775,692 | A | 7/1998 | Watts et al. |
| 5,788,573 | A | 8/1998 | Baerlocher et al. |
| 5,788,574 | A | 8/1998 | Ornstein et al. |
| 5,791,987 | A | 8/1998 | Chen et al. |
| 5,806,855 | A | 9/1998 | Cherry |
| 5,807,172 | A | 9/1998 | Piechowiak |
| 5,816,916 | A | 10/1998 | Moody |
| 5,816,918 | A | 10/1998 | Kelly et al. |
| 5,817,172 | A | 10/1998 | Yamada et al. |
| 5,823,873 | A | 10/1998 | Moody |
| 5,823,874 | A | 10/1998 | Adams |
| 5,839,730 | A | 11/1998 | Pike |
| 5,848,932 | A | 12/1998 | Adams |
| 5,868,619 | A | 2/1999 | Wood et al. |
| 5,882,105 | A | 3/1999 | Barlow |
| 5,882,258 | A | 3/1999 | Kelly et al. |
| 5,902,184 | A | 5/1999 | Bennett |
| 5,910,048 | A | 6/1999 | Feinberg |
| 5,911,418 | A | 6/1999 | Adams |
| 5,934,672 | A | 8/1999 | Sines et al. |
| 5,947,820 | A | 9/1999 | Morro et al. |
| 5,951,397 | A | 9/1999 | Dickinson |
| 5,954,335 | A | 9/1999 | Moody |
| 5,967,893 | A | 10/1999 | Lawrence et al. |
| 5,976,016 | A | 11/1999 | Moody et al. |
| 5,980,384 | A | 11/1999 | Barrie |
| 5,984,310 | A | 11/1999 | English |
| 5,984,781 | A | 11/1999 | Sunaga |
| 5,993,316 | A | 11/1999 | Coyle et al. |
| 5,997,401 | A | 12/1999 | Crawford |
| 6,004,207 | A | 12/1999 | Wilson, Jr. et al. |
| 6,007,066 | A | 12/1999 | Moody |
| 6,007,424 | A | 12/1999 | Evers et al. |
| 6,012,720 | A | 1/2000 | Webb |
| 6,012,981 | A | 1/2000 | Fujioka et al. |
| 6,012,983 | A | 1/2000 | Walker et al. |
| 6,032,955 | A | 3/2000 | Luciano et al. |
| 6,056,642 | A | 5/2000 | Bennett |
| 6,062,980 | A | 5/2000 | Luciano |
| 6,062,981 | A | 5/2000 | Luciano, Jr. |
| 6,071,192 | A | 6/2000 | Weiss |
| 6,077,163 | A | 6/2000 | Walker et al. |
| 6,089,977 | A | 7/2000 | Bennett |
| 6,089,978 | A | 7/2000 | Adams |
| 6,089,980 | A | 7/2000 | Gauselmann |
| 6,093,102 | A | 7/2000 | Bennett |
| 6,098,985 | A | 8/2000 | Moody |
| 6,102,400 | A | 8/2000 | Scott et al. |
| 6,102,402 | A | 8/2000 | Scott et al. |
| 6,105,962 | A | 8/2000 | Malavazos et al. |
| 6,110,041 | A | 8/2000 | Walker et al. |
| 6,113,098 | A | 9/2000 | Adams |
| 6,120,378 | A | 9/2000 | Moody et al. |
| 6,126,165 | A | 10/2000 | Sakamoto |
| 6,126,541 | A | 10/2000 | Fuchs |
| 6,126,542 | A | 10/2000 | Fier |
| 6,129,632 | A | 10/2000 | Luciano |
| 6,132,311 | A | 10/2000 | Williams |
| 6,135,884 | A | 10/2000 | Hedrick et al. |
| 6,142,872 | A | 11/2000 | Walker et al. |
| 6,142,874 | A | 11/2000 | Kodachi et al. |
| 6,149,521 | A | 11/2000 | Sanduski |
| 6,155,925 | A | 12/2000 | Giobbi et al. |
| 6,158,741 | A | 12/2000 | Koelling |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,522 | B1 | 1/2001 | Walker et al. |
| 6,168,523 | B1 | 1/2001 | Piechowiak et al. |
| 6,174,233 | B1 | 1/2001 | Sunaga et al. |
| 6,174,235 | B1 | 1/2001 | Walker et al. |
| 6,179,711 | B1 | 1/2001 | Yoseloff |
| 6,186,894 | B1 | 2/2001 | Mayeroff |
| 6,190,255 | B1 | 2/2001 | Thomas et al. |
| 6,193,606 | B1 | 2/2001 | Walker et al. |
| 6,196,547 | B1 | 3/2001 | Pascal et al. |
| 6,203,429 | B1 | 3/2001 | Demar et al. |
| 6,210,277 | B1 | 4/2001 | Stefan |
| 6,217,022 | B1 | 4/2001 | Astaneha |
| 6,217,448 | B1 | 4/2001 | Olsen |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,244,957 | B1 | 6/2001 | Walker et al. |
| 6,254,482 | B1 | 7/2001 | Walker et al. |
| 6,270,409 | B1 | 8/2001 | Shuster |
| 6,290,603 | B1 | 9/2001 | Luciano, Jr. |
| 6,299,165 | B1 | 10/2001 | Nagano |
| 6,302,790 | B1 | 10/2001 | Brossard |
| 6,302,791 | B1 | 10/2001 | Frohm et al. |
| 6,309,299 | B1 | 10/2001 | Weiss |
| 6,312,331 | B1 | 11/2001 | Tamaki |
| 6,312,334 | B1 | 11/2001 | Yoseloff |
| 6,315,662 | B1 | 11/2001 | Jorasch et al. |
| 6,336,862 | B1 | 1/2002 | Byrne |
| 6,358,147 | B1 | 3/2002 | Jaffe et al. |
| 6,368,214 | B1 | 4/2002 | Luciano |
| 6,375,569 | B1 | 4/2002 | Acres |
| 6,375,570 | B1 | 4/2002 | Poole |
| 6,394,902 | B1 | 5/2002 | Glavich et al. |
| 6,398,218 | B1 | 6/2002 | Vancura |
| 6,413,163 | B1 | 7/2002 | Yamauchi et al. |
| 6,419,578 | B1 | 7/2002 | Moody et al. |
| 6,425,823 | B1 | 7/2002 | Byrne |
| 6,428,412 | B1 | 8/2002 | Anderson et al. |
| 6,435,968 | B1 | 8/2002 | Torango |
| 6,439,995 | B1 | 8/2002 | Hughs-Baird et al. |
| 6,443,456 | B1 | 9/2002 | Gajor |
| 6,450,884 | B1 | 9/2002 | Seelig et al. |
| 6,468,156 | B1 | 10/2002 | Hughs-Baird et al. |
| 6,491,584 | B2 | 12/2002 | Graham et al. |
| 6,517,073 | B1 | 2/2003 | Vancura |
| 6,569,013 | B1 | 5/2003 | Taylor |
| 6,599,193 | B2 | 7/2003 | Baerlocher et al. |
| 6,607,195 | B2 | 8/2003 | Vancura |
| 6,609,969 | B1 | 8/2003 | Luciano et al. |

| | | | | |
|---|---|---|---|---|
| 6,609,970 | B1 | 8/2003 | Juciano, Jr. | |
| 6,612,927 | B1 | 9/2003 | Slomiany et al. | |
| 6,634,942 | B2 | 10/2003 | Walker et al. | |
| 6,634,945 | B2 | 10/2003 | Glavich et al. | |
| 6,656,043 | B2 | 12/2003 | Seelig et al. | |
| 6,682,073 | B2 | 1/2004 | Bryant et al. | |
| 6,692,003 | B2 | 2/2004 | Potter et al. | |
| 6,695,696 | B1 | 2/2004 | Kaminkow | |
| 6,702,289 | B1 | 3/2004 | Feola | |
| 6,702,675 | B2 | 3/2004 | Poole et al. | |
| 6,712,693 | B1 | 3/2004 | Hettinger | |
| 6,712,695 | B2 | 3/2004 | Mothwurf et al. | |
| 6,726,563 | B1 | 4/2004 | Baerlocher et al. | |
| 6,739,970 | B2 | 5/2004 | Luciano | |
| 6,746,016 | B2 | 6/2004 | Perrie et al. | |
| 6,758,749 | B2 | 7/2004 | Krintzman | |
| 6,764,396 | B2 | 7/2004 | Seelig et al. | |
| 6,786,824 | B2 | 9/2004 | Cannon | |
| 6,802,778 | B1 | 10/2004 | Lemay et al. | |
| 6,857,957 | B2 | 2/2005 | Marks et al. | |
| 6,884,167 | B2 | 4/2005 | Walker et al. | |
| 6,923,720 | B2 | 8/2005 | Loose | |
| 6,960,133 | B1 | 11/2005 | Marks et al. | |
| 7,001,274 | B2 | 2/2006 | Baerlocher et al. | |
| 7,008,324 | B1 | 3/2006 | Johnson et al. | |
| 7,014,560 | B2 | 3/2006 | Glavich et al. | |
| 7,029,395 | B1 | 4/2006 | Baerlocher | |
| 7,052,395 | B2 | 5/2006 | Glavich et al. | |
| 7,121,943 | B2 | 10/2006 | Webb et al. | |
| 7,198,569 | B2 | 4/2007 | Wolf et al. | |
| 7,329,179 | B2 | 2/2008 | Baerlocher | |
| 7,393,278 | B2 | 7/2008 | Gerson et al. | |
| 7,419,429 | B2 | 9/2008 | Taylor | |
| 7,699,699 | B2 * | 4/2010 | Gilliland et al. | 463/20 |
| 7,727,061 | B2 | 6/2010 | Taylor | |
| 7,727,068 | B2 | 6/2010 | Peterson | |
| 7,874,908 | B2 * | 1/2011 | Walker et al. | 463/20 |
| 2001/0018361 | A1 | 8/2001 | Acres | |
| 2001/0038178 | A1 | 11/2001 | Vancura | |
| 2001/0054794 | A1 | 12/2001 | Cole et al. | |
| 2002/0086725 | A1 | 7/2002 | Fasbender et al. | |
| 2002/0137559 | A1 | 9/2002 | Baerlocher | |
| 2002/0165023 | A1 | 11/2002 | Brosnan et al. | |
| 2002/0187827 | A1 | 12/2002 | Blankstein | |
| 2002/0193158 | A1 | 12/2002 | Weiss et al. | |
| 2003/0025211 | A1 | 2/2003 | Bruce et al. | |
| 2003/0027623 | A1 | 2/2003 | Rose | |
| 2003/0054873 | A1 | 3/2003 | Peterson | |
| 2003/0060266 | A1 | 3/2003 | Baerlocher | |
| 2003/0060269 | A1 | 3/2003 | Paulsen et al. | |
| 2003/0060281 | A1 | 3/2003 | Vancura | |
| 2003/0069063 | A1 | 4/2003 | Bilyeu et al. | |
| 2003/0092480 | A1 | 5/2003 | White et al. | |
| 2003/0092490 | A1 | 5/2003 | Gauselmann | |
| 2003/0153383 | A1 | 8/2003 | Baerlocher et al. | |
| 2003/0195031 | A1 | 10/2003 | O'Donovan et al. | |
| 2003/0207713 | A1 | 11/2003 | Taylor | |
| 2003/0216165 | A1 | 11/2003 | Singer et al. | |
| 2004/0017043 | A1 | 1/2004 | Moody | |
| 2004/0038724 | A1 | 2/2004 | Asdale | |
| 2004/0048650 | A1 | 3/2004 | Mierau et al. | |
| 2004/0162129 | A1 | 8/2004 | Nelson | |
| 2004/0219969 | A1 | 11/2004 | Casey et al. | |
| 2004/0242313 | A1 | 12/2004 | Munoz | |
| 2004/0242315 | A1 | 12/2004 | Paulsen et al. | |
| 2004/0254011 | A1 | 12/2004 | Muskin | |
| 2005/0009597 | A1 | 1/2005 | Daly | |
| 2005/0029745 | A1 | 2/2005 | Walker et al. | |
| 2005/0037838 | A1 | 2/2005 | Dunaevsky et al. | |
| 2005/0054429 | A1 | 3/2005 | Baerlocher et al. | |
| 2005/0059481 | A1 | 3/2005 | Joshi et al. | |
| 2005/0060050 | A1 | 3/2005 | Baerlocher | |
| 2005/0071023 | A1 | 3/2005 | Gilliland et al. | |
| 2005/0079911 | A1 | 4/2005 | Nakatsu | |
| 2005/0090306 | A1 | 4/2005 | Seelig et al. | |
| 2005/0096121 | A1 | 5/2005 | Gilliland et al. | |
| 2005/0096123 | A1 | 5/2005 | Cregan et al. | |
| 2005/0130737 | A1 | 6/2005 | Englman et al. | |
| 2005/0176494 | A1 | 8/2005 | Thomas | |
| 2005/0208992 | A1 | 9/2005 | Randall | |
| 2005/0215311 | A1 | 9/2005 | Hornik et al. | |
| 2005/0218590 | A1 | 10/2005 | O'Halloran et al. | |
| 2005/0233803 | A1 | 10/2005 | Yang | |
| 2005/0282615 | A1 | 12/2005 | Englman et al. | |
| 2005/0282625 | A1 | 12/2005 | Nicely | |
| 2005/0282629 | A1 | 12/2005 | Gagner | |
| 2005/0285337 | A1 | 12/2005 | Durham et al. | |
| 2006/0003834 | A1 | 1/2006 | Okada | |
| 2006/0009283 | A1 | 1/2006 | Englman et al. | |
| 2006/0009286 | A1 | 1/2006 | Durham et al. | |
| 2006/0014580 | A1 | 1/2006 | Hawthorn | |
| 2006/0025193 | A1 * | 2/2006 | Gail et al. | 463/16 |
| 2006/0025211 | A1 | 2/2006 | Wilday et al. | |
| 2006/0040728 | A1 | 2/2006 | Fuller | |
| 2006/0046816 | A1 | 3/2006 | Walker et al. | |
| 2006/0063580 | A1 | 3/2006 | Nguyen et al. | |
| 2006/0069619 | A1 | 3/2006 | Walker et al. | |
| 2006/0073873 | A1 | 4/2006 | Rodgers et al. | |
| 2006/0073897 | A1 | 4/2006 | Englman et al. | |
| 2006/0094495 | A1 | 5/2006 | Gelber et al. | |
| 2006/0205480 | A1 | 9/2006 | Glavich et al. | |
| 2006/0287034 | A1 | 12/2006 | Englman et al. | |
| 2007/0021182 | A1 | 1/2007 | Gauselmann | |
| 2007/0060292 | A1 | 3/2007 | Peterson | |
| 2007/0087804 | A1 | 4/2007 | Knowles et al. | |
| 2007/0135207 | A1 | 6/2007 | Tarantino | |
| 2007/0287532 | A1 | 12/2007 | Jackson | |
| 2008/0076503 | A1 | 3/2008 | Mattice et al. | |
| 2008/0102934 | A1 | 5/2008 | Tan | |
| 2008/0214292 | A1 | 9/2008 | Bryant et al. | |
| 2009/0011827 | A1 | 1/2009 | Englman et al. | |
| 2009/0042652 | A1 | 2/2009 | Baerlocher et al. | |
| 2010/0160031 | A1 * | 6/2010 | Gilliland et al. | 463/20 |

FOREIGN PATENT DOCUMENTS

| | | | |
|---|---|---|---|
| AU | 200245837 | | 12/2002 |
| DE | 3105266 | | 9/1982 |
| EP | 0 558307 | A2 | 2/1993 |
| EP | 753 331 | A2 | 1/1997 |
| EP | 874 337 | A1 | 10/1998 |
| EP | 945 837 | A2 | 9/1999 |
| EP | 0 981 119 | A2 | 2/2000 |
| EP | 0 984 407 | A2 | 3/2000 |
| EP | 989 531 | A2 | 3/2000 |
| EP | 1 076 321 | A1 | 2/2001 |
| EP | 1 195 730 | A2 | 4/2002 |
| EP | 1 536 388 | A1 | 1/2005 |
| EP | 1 513 114 | A2 | 3/2005 |
| EP | 1 513 116 | A2 | 3/2005 |
| EP | 1 580 701 | A2 | 3/2005 |
| EP | 1 589 501 | A1 | 10/2005 |
| GB | 970806 | | 9/1964 |
| GB | 2 137 392 | A | 10/1984 |
| GB | 2 292 245 | | 2/1996 |
| GB | 2 322 217 | A | 8/1998 |
| GB | 2 382 911 | | 6/2003 |
| GB | 2 387 950 | A | 10/2003 |
| WO | WO 85/00910 | | 2/1985 |
| WO | WO 98/00207 | | 1/1998 |
| WO | WO 99/03078 | | 1/1999 |
| WO | WO 01/15055 | | 3/2001 |
| WO | WO 02/078804 | | 10/2002 |
| WO | WO 03/026757 | | 4/2003 |
| WO | WO 2005/010831 | | 2/2005 |
| WO | WO 2005/077480 | | 8/2005 |
| WO | WO 2005/083599 | | 9/2005 |
| WO | WO 2006/002241 | | 1/2006 |
| WO | WO 2006/004831 | | 1/2006 |
| WO | WO 2006/015442 | | 2/2006 |
| WO | WO 2006/017431 | | 2/2006 |
| WO | WO 2007/090270 | | 8/2007 |

OTHER PUBLICATIONS

3RV—Jackpot Party Advertisement written by WMS Gaming, Inc., published Aug. 8, 2002.

Big Times Red, White & Blue Advertisement written by IGT published 2005.

Bonus Games Advertisement written by IGT, published in 1999.
Bunco History and Rules, printed from http://world-bunco.com/history.html on May 22, 2000.
Creepy and Kooky written by Frank Legato, published by Strictly Slots in Jul. 2000, pp. 52-54.
Jackpot Party Advertisement on website page http://www.wmsgaming.com/products/slot/jpp/index.html, printed on Mar. 21, 2001.
Jackpot Party Brochures and Articles written by WMS Gaming, Inc., published in Mar. 1998.
Jackpot Party Video 9-Line Advertisement written by WMS Gaming, Inc., available prior to Nov. 8, 2006.
Jeopardy Advertisements written by IGT, published in 2000.
Jeopardy Video Slots advertisement written by IGT, published in 2000.
Jeopardy, MegaJackpots Advertisement written by IGT, published in 1998.
Monopoly Blackjack Edition Game described in Mikohn brochure, published in 2000.
Multi-Action Blackjack brochure, http://conjelco.com/faq/bj.html from Apr. 25, 2001, printed on Jul. 30, 2001.
Multi-Play Poker by Bally Gaming, described in Strictly Slots, published in Dec. 2000.
Multi-Play Poker by Bally Gaming, printed from ballygaming.com/products/multi-play-poker.html on Apr. 25, 2001.
Play It Again Poker Brochure, written by IGT, published in 1999.
Pogo.com website description, printed from Wikipedia, http://en.wikipedia.org/wiki/Pogo.com on Jun. 14, 2010, available in Jul. 2003.
Power Slotto Brochure published by AC Coin & Slot in or before Dec. 2002.
Slot Machines, A Pictorial History of the First 100 Years, written by Marshall Fey, published by Liberty Belle Books, 1983 1989, 1991, 1994, 1997.
Slots 2003 Article written by Melissa Raimondi, published in Jan. 2003.
Super Bonus Poker by Bally Gaming, described in Strictly Slots, published in Apr. 2000.
Super Times Pay Poker Advertisement, written by IGT, published in 2003.
Totem Pole Advertisement, written by IGT, published in 1997, in or before December thereof.
Turboreel by Barcrest, available prior to Nov. 8, 2006 (with English Translation).
We Make Gaming Fun! Advertisement written by WMS Gaming Inc., available prior to Nov. 8, 2006.
Wheel of Madness Game, described in AC Coin & Slot brochure, published in 2000.

* cited by examiner

FIG. 4A

| Dollars In | Expected Win | |
|---|---|---|
| | Normal 90% | Premium 95% |
| 0 | $ - | $ -10.00 |
| 20 | $ 18.00 | $ 9.00 |
| 40 | $ 36.00 | $ 28.00 |
| 60 | $ 54.00 | $ 47.00 |
| 80 | $ 72.00 | $ 66.00 |
| 100 | $ 90.00 | $ 85.00 |
| 120 | $ 108.00 | $ 104.00 |
| 140 | $ 126.00 | $ 123.00 |
| 160 | $ 144.00 | $ 142.00 |
| 180 | $ 162.00 | $ 161.00 |
| 200 | $ 180.00 | $ 180.00 |
| 220 | $ 198.00 | $ 199.00 |
| 240 | $ 216.00 | $ 218.00 |
| 260 | $ 234.00 | $ 237.00 |
| 280 | $ 252.00 | $ 256.00 |
| 300 | $ 270.00 | $ 275.00 |
| 320 | $ 288.00 | $ 294.00 |
| 340 | $ 306.00 | $ 313.00 |
| 360 | $ 324.00 | $ 332.00 |
| 380 | $ 342.00 | $ 341.00 |
| 400 | $ 360.00 | $ 370.00 |
| 420 | $ 378.00 | $ 389.00 |
| 440 | $ 396.00 | $ 408.00 |
| 460 | $ 414.00 | $ 427.00 |
| 480 | $ 432.00 | $ 446.00 |
| 500 | $ 450.00 | $ 465.00 |

FIG. 5A

| Dollars In | Expected Win | | |
|---|---|---|---|
| | Normal 88% | Premium 91% | Golden 95% |
| 0 | $ - | $ -10.00 | $ -20.00 |
| 20 | $ 17.60 | $ 8.20 | $ 9.00 |
| 40 | $ 35.20 | $ 26.40 | $ 28.00 |
| 60 | $ 52.80 | $ 44.60 | $ 37.00 |
| 80 | $ 70.40 | $ 62.80 | $ 56.00 |
| 100 | $ 88.00 | $ 81.00 | $ 75.00 |
| 120 | $ 105.60 | $ 99.20 | $ 94.00 |
| 140 | $ 123.20 | $ 117.40 | $ 113.00 |
| 160 | $ 140.80 | $ 135.60 | $ 132.00 |
| 180 | $ 158.40 | $ 153.80 | $ 151.00 |
| 200 | $ 176.00 | $ 172.00 | $ 170.00 |
| 220 | $ 193.60 | $ 190.20 | $ 189.00 |
| 240 | $ 211.20 | $ 208.40 | $ 208.00 |
| 260 | $ 228.80 | $ 226.60 | $ 227.00 |
| 280 | $ 246.40 | $ 244.80 | $ 246.00 |
| 300 | $ 264.00 | $ 263.00 | $ 265.00 |
| 320 | $ 281.60 | $ 281.20 | $ 284.00 |
| 340 | $ 299.20 | $ 299.40 | $ 303.00 |
| 360 | $ 316.80 | $ 317.60 | $ 322.00 |
| 380 | $ 334.40 | $ 335.80 | $ 341.00 |
| 400 | $ 352.00 | $ 354.00 | $ 360.00 |
| 420 | $ 369.60 | $ 372.20 | $ 379.00 |
| 440 | $ 387.20 | $ 390.40 | $ 398.00 |
| 460 | $ 404.80 | $ 408.60 | $ 419.00 |
| 480 | $ 422.40 | $ 426.80 | $ 436.00 |
| 500 | $ 440.00 | $ 445.00 | $ 455.00 |

GAMING DEVICE AND METHOD HAVING PURCHASABLE ENHANCED PAYTABLES

PRIORITY CLAIM

This application is a continuation of and claims priority to Non-Provisional patent application Ser. No. 11/557,843, filed on Nov. 8, 2006, the entire contents of which are incorporated herein by reference.

CROSS REFERENCE TO RELATED APPLICATIONS

The present disclosure relates to the following co-pending commonly owned U.S. patent applications: "GAMING DEVICE AND METHOD HAVING PURCHASABLE RANDOMLY SELECTED PAYTABLES," Ser. No. 11/469,584.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Certain known gaming devices use devices such as reels or wheels to enhance the attraction of the gaming machines to players and also to enhance the player's game playing experience.

Many known slot gaming devices include a plurality of reels and one or more paylines. Such gaming devices typically include any suitable number of reels, such as three to five reels, which each have any suitable number of symbols, such as three symbols per reel. In these gaming devices, the player initiates the spinning of the reels by making one or more wagers on one or more paylines. Such gaming devices may have one, three, five, nine, fifteen, twenty-five or any other suitable number of paylines which extend horizontally, vertically, diagonally or any combination thereof. The player wagers on a player selected number or combination of paylines, such as one, two, three, five, ten or fifteen paylines and the reels are activated to spin.

After the reels spin to generate a plurality of symbols, the gaming device analyzes the generated symbols to determine if the gaming device has randomly generated a winning symbol or winning symbol combination on one or more of the wagered on paylines. A paytable determines the award that a player wins if a designated winning symbol or designated winning symbol combination occurs on an activated payline. A line pay award typically is calculated by multiplying the award value for the winning symbol or winning symbol combination by the amount wagered upon the payline upon which the winning symbol combination appears. Such calculated awards are provided to the player.

In conventional slot games, for example, if a player wagers one credit on a first payline and another credit on a second payline, the player has activated two paylines. Making an additional wager activates another payline or increases the wager played on an activated payline. This creates a play of the game having a certain number of activated paylines by a certain number of credits per payline.

Most slot machines are set to pay back on average a certain percentage of the amount of money wagered by players. The average percentage of money wagered that is paid back to the player as an award is sometimes called the average expected payback or average expected payback percentage. The average payback provided by a game is determined by the paytable. In a slot game, a paytable determines the award that will be provided to a player if certain winning symbols or winning symbol combinations appear on an activated payline. In gaming devices played at most existing gaming machines, the paytables and winning combinations of the slot machine are predetermined.

Many known gaming devices enable players to make one or more side bets or side wagers. Such side bets are additional wagers placed by the player in a play of the game. The player's side bet provides the player a chance of obtaining a supplemental award in the play of the game, in addition to the player's existing chance of obtaining a first award. Awards are sometimes based on these side bets. Side bets are generally made one play at a time.

Gaming device manufacturers constantly strive to make gaming devices that provide as much enjoyment and excitement as possible. It is desirable to provide new games which vary award returns and risk to increase player excitement and enjoyment.

SUMMARY

The present disclosure provides a gaming device and method having a paytable selection feature which may be implemented with a primary or base game, a secondary or bonus game, or both. More specifically, one embodiment of the present disclosure provides a processor-controlled game on the gaming device which includes a plurality of different paytables. The gaming device employs an initial paytable and enables a player to select a different paytable for a plurality of plays of the game. If the player chooses to select a different paytable, in one embodiment, the gaming device determines a game outcome for each of the plurality of plays of the game and provides any awards based on the different paytable. If the player does not choose to select a different paytable, the gaming device determines a game outcome for each of those plays and provides any awards based on the initial paytable. In one embodiment, a player playing the game employing the initial paytable may choose at any suitable time between each play of the game to select a different paytable for a plurality of subsequent plays of the game.

In one embodiment where the paytable selection feature of the present disclosure is implemented with a secondary or bonus game, if the player chooses to select a different paytable, the different paytable is employed in the secondary or bonus game when the secondary or bonus game is triggered, such as by a suitable bonus triggering event in the primary or base game.

In one embodiment, the gaming device enables the player to replace the initial paytable with a different paytable upon a designated event, such as the player paying a fee. If the player chooses to pay the fee, the gaming device determines a game outcome and provides any awards based on the different paytable for each of a plurality of plays of the game.

In one embodiment the plurality of plays of the game includes a designated number of plays, such as 10, 20, 30, 100, or 1000 plays. In another embodiment, the plurality of plays is based on time. That is, the player has a certain amount of time, such as 1 hour, 2 hours, a day, or 2 days, to play the game with the selected paytable. In one such an embodiment, the player can play as many games as they desire during the time period. In one such embodiment, there is a maximum limit on the number of plays during that time period. In one embodiment, the number of plays is determined based on wager level. In another embodiment, the number of plays depends on the fee that the player paid to select a new paytable. For example, if a player pays a fee of $10 to purchase a different paytable, the gaming device enables the player to play 50 plays of the game with the purchased paytable. If the player pays $20 to purchase a different paytable, the gaming device enables the player to play 100 plays of the game with the purchased paytable. In one such embodiment, the relationship between the fee paid and the number of plays of the game provided to the player is linear. Alternatively, the relationship between the fee and the number of plays of the game provided to the player is non-linear.

In another embodiment, the player plays with the selected or purchased paytable for as long as the player has credits on the gaming, machine or has a player tracking card in the machine. In another embodiment, the number of plays of the game that the player can play is unlimited. Thus, the player determines the end of the game (i.e., plays of the game are limited only by player choice). It should be appreciated that the number of plays may be determined in any suitable manner.

In one embodiment, the gaming device includes an initial standard paytable and a premium paytable. In this embodiment, the gaming device employs the standard paytable. The gaming device displays the standard paytable to a player or makes the standard paytable displayable to the player upon input of a request by the player to see the paytable, as is known in the industry. In one embodiment, the gaming device enables the player to replace the standard paytable with the premium paytable for the plurality of plays of the game upon the player paying a fee. If the player pays the fee, the gaming device determines a game outcome for each of a plurality of plays of the game and provides the player with any awards based on the premium paytable.

In one embodiment, if the player chooses to pay the fee for the premium paytable, the premium paytable gives the player an advantage in the game. In different embodiments, the premium paytable is better for the player in one or more ways, such as by having higher average expected payback or higher awards, and to different extents. In certain embodiments, the gaming device displays the premium paytable to the player before the player must make the decision to purchase it for the plurality of plays of the game. In such embodiments, the player can visually see the benefits of replacing the standard paytable with the premium paytable before paying the fee.

It should be appreciated that the fee for buying the premium paytable is not a wager. Rather, the fee is the cost of buying the opportunity to play a plurality of plays of the game using a higher paying paytable. The wager on each of the plays with the premium paytable does not need to be greater than the wagers on the plays of the game with the initial paytable. In one embodiment, the player pays the fee to replace the initial or standard paytable with the premium paytable before placing a wager to play the game. For example, upon sitting down at the gaming device, the player deposits an amount of money, such as 100 dollars, into the gaming device. The credit meter displays the number of credits corresponding to the 100 dollars. The gaming device displays the standard paytable to the player and enables the player to purchase the premium paytable for an upfront fee of 5 dollars. If the player chooses to pay the fee, the gaming device deducts the 5 dollars from the 100 dollars on the credit meter of the gaming device. The gaming device enables the player to place a wager to cause a play of the game employing the premium paytable using a portion of the remaining 95 dollars on the credit meter. The player may play a plurality of plays of the game employing the premium paytable using these funds deposited in the gaming device.

In one embodiment, the fee to buy a better paytable, such as the premium paytable, is determined based on how many games or how much time the game operator wants a player to have to play (on average) using that paytable before the player begins to realize the benefits of the investment (i.e., the money spent to purchase the better paytable). In one sense, this amount of time can be represented by across point. The cross point is the point in time where, on average, the fee has been recouped, and the player is now purely playing with a paytable that gives the player a better advantage in the game.

In another embodiment, instead of determining the fee based on an amount of time, the game operator specifies that the player must, on average, wager a certain number of credits (i.e., a total wager amount) while playing with the premium paytable before reaching the cross point. After wagering the specified number of credits, on average, the player recoups the cost of purchasing the premium paytable. In such an embodiment, the time it takes for a player to reach the cross point depends on the amount of each wager placed to play the game (i.e., the number of credits wagered), and how frequently the player is wagering.

In one example illustrating the cross point, the gaming device offers a standard paytable having an average expected payout of 90% and a premium paytable having an average expected payout of 95%. The gaming device enables the player to pay a fee of 5 dollars to play a plurality of games with the premium paytable. If the player pays the fee to play with the premium paytable, the player begins game play with a loss of 5 dollars. After wagering 100 dollars in a plurality of plays of the game employing the premium paytable, the player's average expected award or return is 95 dollars (100×95%). If the player chooses to play with the 90% standard paytable, the average expected award or return after wagering 100 dollars would be 90 dollars (100×90%). Therefore, in this example, the premium player is in the same position as the standard player after wagering 100 dollars in the game. That is, the premium player has recouped the 5 dollars spent to purchase the premium paytable. Thus, the cross point comes when the player has wagered 100 dollars in this example. After this cross point, the premium player is purely playing the game with a higher paying paytable.

It should be appreciated that, prior to reaching the cross point, the player is still playing the game with the premium paytable, but the player will not, on average, see a benefit because the player has not yet recouped the money spent to play with or buy the premium paytable. Accordingly, any player who does not play up to the cross point on average has a lower expected return than if they had not played on the premium paytable.

It should also be appreciated that the cross point is a theoretical cross point. That is, in operation, a player may actually recoup the cost of the fee before or after the theoretical cross point established by the game operator. For example, a player who purchases the premium paytable could be provided a large award for a big win in the first play of the game employing the premium paytable and immediately recoup the cost of the fee. In this case, the player reaches the actual cross point (i.e., has recouped the cost of the fee) after only one play of the game. Therefore, it is possible to recoup the entire cost or fee for purchasing the premium paytable in a first play (or the first few plays) of the game. As described herein, after recouping the cost of the fee, the player continues playing the game purely with the higher paying paytable.

A player who plays long enough to reach and to play beyond the cross point has a higher expected return than if they did not purchase the premium paytable. Once a player has recouped the upfront fee for the premium paytable, that player may continue to play at the gaming device for the remaining number of plays or remaining time period employing the premium paytable to get the most out of the investment in or purchase of the premium paytable. The player's continued play is beneficial to the game operator. Although the player is playing with the premium paytable, in one embodiment, the premium paytable does not have an average expected payback of 100%. Thus, getting the player to play at the gaming device for a longer period of time, even with the higher paying paytable, is profitable for the game operator.

In one alternative embodiment, the premium paytable has a 100% expected payback. In one such embodiment, the game operator collects an entrance fee from the player to purchase the paytable, and the player plays a plurality of plays of the game with the 100% paytable. In this embodiment, the game operator keeps the cost of the entrance fee as profit on average.

In one embodiment, the game operator can specify the amount of time that the player must play before recouping the fee for a new paytable. For example, a game operator may specify that the player must play for 30 minutes before recouping their fee. The gaming device manufacturer uses this amount of time, the cost per play, the average speed of play, and the average expected payback of the paytable to determine the fee to charge for the higher paying paytable.

In one example embodiment where the player is wagering $1 per play, approximately every ten seconds, the game operator specifies that the player must play for thirty minutes to recoup their investment. Over a thirty minute period, the player is wagering $180. If the standard paytable pays back 90%, the profit for the game operator based on the parameters described above is $18 per half hour. If the premium paytable pays back 92.5%, the profit for the game operator based on the parameters described above is $13.50. Thus, the premium paytable represents a loss of $4.50 to the game operator over this half hour. In this example, the game operator sets the fee to purchase the premium paytable at $4.50 for a cross point of a half hour.

In one embodiment, the operator picks from a number of preset selections to set the fee for buying a higher paying paytable. In one such embodiment, each of the selections corresponds to an amount of time that the player must play to recoup the cost of the fee. The game operator picks one of the selections corresponding to a desired amount of time, and the fee associated with that amount of time is set. Referring again to the example above, if the operator wants the player to play for thirty minutes before recouping the fee to purchase the premium paytable, the operator picks the preset selection corresponding to thirty minutes, and the fee of $4.50 is automatically set.

The fee varies based on the time period that players are required to play before they are able to realize the benefit of their investment. For instance, if the cross point is one hour, rather than a half an hour, the determined fees are different. In one example, if the player is wagering $360 per hour, this represents the following profits to the casino over that hour: $36/hour using the standard 90% paytable and $27/hour using the 92.5% premium paytable. Therefore, the fee for the premium paytable with an hour cross point is $9 ($36–$27).

In such embodiments, game operators have the ability to vary cross points and, as a result, control the fees required to purchase different paytables. The game operator can set the cross point at any suitable time and determine the fee to purchase each different paytable based on the desired cross point. It should be appreciated that, if a player is playing slower or faster than an average player, it will take them less time or more time, respectively, to reach the cross point. In alternative embodiments, rather than being determined based on time, the fee is determined based on other factors, such as a number of plays played by the player, a number of previous wins, a number of previous losses, or any combination of these.

In certain embodiments, the game operator may set higher denomination gaming devices to have lower cross-points than smaller denomination gaming devices. For example, a player playing on a $1 machine may have to play a half hour to recoup the cost of the fee, but a player playing on a penny machine may have to play for a two hours before reaching the cross point.

In one alternative embodiment, rather than charging the player an upfront fee to play with the premium paytable, the gaming device enables the player to choose to play the game with the premium paytable and pay for that paytable as the player wins in the game. That is, each time the player wins in the plays of the game employing the premium paytable, the gaming device keeps the difference between the win with the premium paytable and the win with the standard paytable until the fee for purchasing the premium paytable is paid off.

In one embodiment, the gaming device includes a standard paytable and a plurality of different advantageous paytables, such as a premium paytable and a golden paytable. The gaming device initially employs the standard paytable. The gaming device enables the player to select one of the other paytables by paying one of a plurality of fees. If the player pays a first fee, the gaming device replaces the standard paytable with the premium paytable and determines a game outcome for plurality of plays of the game and uses the premium paytable to determine the awards. In certain embodiments, the average expected payback of the premium paytable is higher than the average expected payback of the standard paytable. Therefore, the player obtains an advantage in the game by paying the first fee to get the premium paytable. If the player pays a second fee, the gaming device replaces the standard paytable with the golden paytable and determines a game outcome for a plurality of plays of the game and uses the golden paytable to determine the awards. In one embodiment, the average expected payback of the golden paytable is higher than the average expected payback of both the premium paytable and the standard paytable. Thus, the player gets an even greater advantage in the game by paying the second fee to play with the golden paytable.

In one example embodiment, the gaming device includes a standard paytable having an average expected payout of 90%, a premium paytable having an average expected payout of 92.5%, and a golden paytable having an average expected payout of 95%. In this example, the player is wagering $1 per play, approximately every ten seconds, and the game operator specifies that the player must play for thirty minutes to recoup their investment. Over a thirty minute period, the player is wagering $180. The profits for the game operator based on the parameters described above are: $18 per half hour for standard play; $13.50 per half hour for premium play; and $9.00 per half hour for golden play. Compared to the standard paytable having an average expected payout of 90%, the golden paytable represents a loss of $9.00 to the game operator over the half hour. Thus, if player wishes to play participate in golden play (i.e., play with the golden paytable) and the operator wishes to maintain the same payback percentage, the fee to purchase the golden table is $9.00. The player will have to play with the golden paytable for about a half hour before the player begins to realize the benefits of golden play (i.e., recoups the upfront fee paid for the golden paytable).

In one embodiment, the premium play feature of the present disclosure is implemented in a server based environment. In one such embodiment, a central server, central controller, or remote host is in communication with or linked to a plurality of gaming machines or gaming devices. In one embodiment, each of the linked gaming devices includes one or a plurality of primary games, wherein each of the games is associated with a paytable. In one embodiment, each of the gaming devices in the gaming system is enabled to participate in premium play.

In one such embodiment, the individual paytables of the gaming devices are not associated with the premium play. Rather, the central server pays the premium awards as opposed to the paytable of each gaming device in the gaming system. In one such embodiment, the central controller or server maintains a pool which is used to provide the increased or premium awards associated with premium play. In this embodiment, the premium awards are paid through the pool maintained by the central server, rather than through the individual paytables the gaming devices. Thus, the central server is not burdened with monitoring the details of each individual paytable of the gaming devices, such as the winning symbol combinations, the corresponding award amounts, or the frequency of hits.

In one embodiment, each player playing at a gaming device in the gaming system is required to pay a fee to participate in premium play. In one such embodiment, each of the fees paid by the players to participate in premium play are allocated to the pool maintained by the central server. In another embodiment, a portion or percentage of each fee is allocated to the pool. In one embodiment, a portion or percentage of each fee is kept by the casino or game operator as commission.

In one embodiment, the central server monitors the wins that occur at each of the gaming devices participating in premium play. When a win under a threshold amount occurs, the central server allocates a percentage of that win to the premium pool. In one embodiment, the percentage allocated to the pool is equal to the difference between the average expected payout of the standard paytable and the average expected payout of the premium paytable. When a win above the threshold amount occurs, the central server awards the premium pool to the player who triggered the win.

In one example embodiment, a premium paytable is associated with a 95% average expected payback and a standard paytable is associated with a 90% average expected payback. In this example, there is a 5% difference between the average expected payback of 95% premium paytable and the 90% standard paytable. The central server monitors the wins that occur at each of the gaming devices participating in premium play. Each time a win under a threshold amount occurs, the central server allocates 5% of that win to the pool. When a win above the threshold amount occurs, the central server awards the pool to the player who triggered the win above the threshold amount. Thus, in this embodiment, a player who pays the upfront fee to participate in premium play has the opportunity to win the entire premium pool for triggering a win above the threshold amount.

It is therefore an advantage of the present disclosure to provide a gaming device that enables a player to have a direct impact on selecting the paytable employed by the gaming device.

Another advantage of the present disclosure is to provide a gaming device that has variability in awards.

A further advantage of the present disclosure is to increase player excitement by dynamically changing the possible awards in a game and increasing the level of player interaction.

Another advantage of the present disclosure is to provide a gaming device where players who are willing to pay more receive a benefit.

Other objects, features and advantages of the disclosure will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 4A is a table comparing the expected win amounts associated with a standard paytable to the expected win amounts associated a premium paytable in one embodiment of the present disclosure.

FIG. 5A is a table comparing the expected win amounts associated with a standard paytable, a premium paytable, and a golden paytable in one embodiment of the present disclosure.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
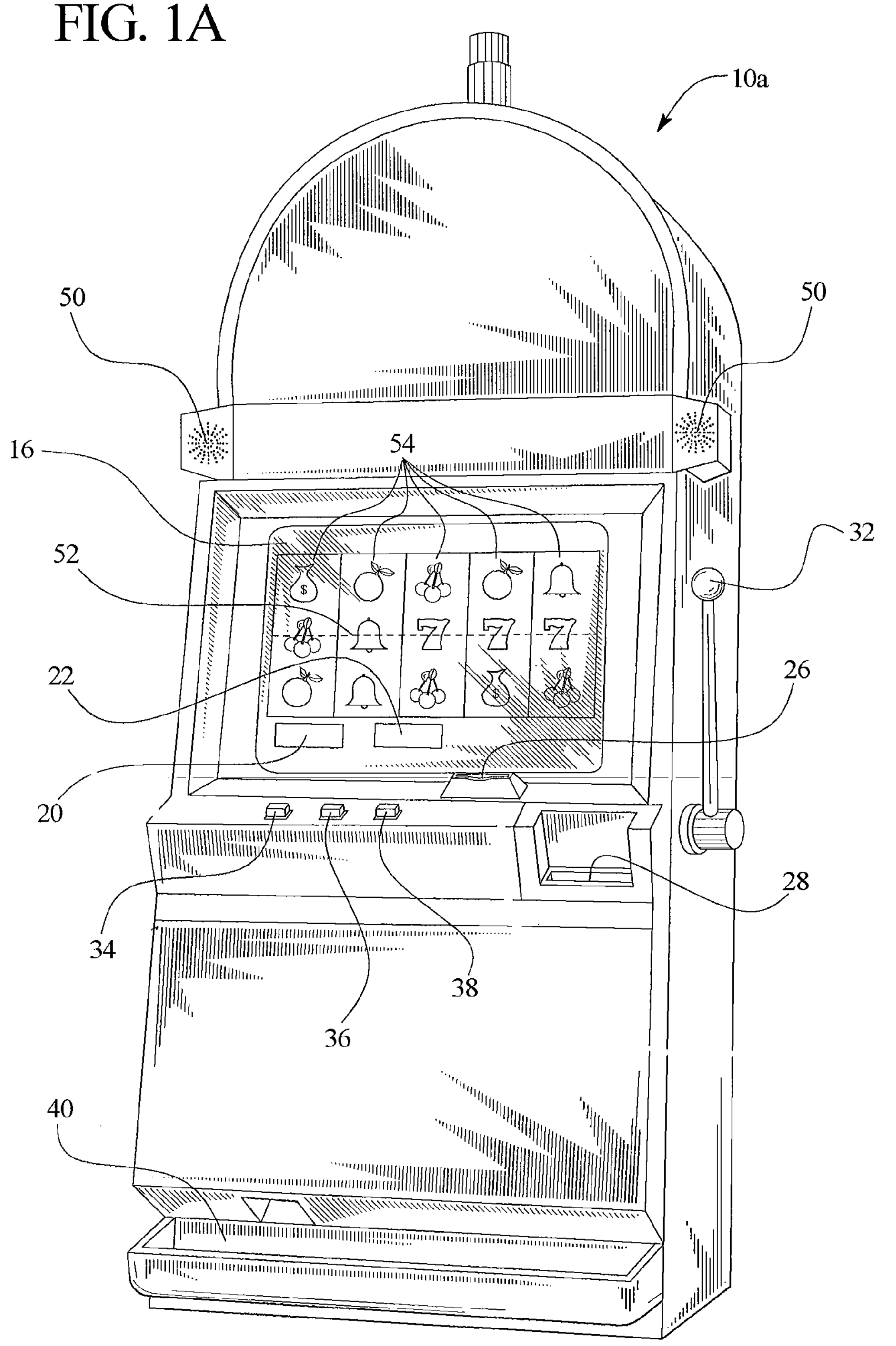
FIGS. 1A and 1B are perspective views of example alternative embodiments of the gaming device of the present disclosure.
Figure 1B:
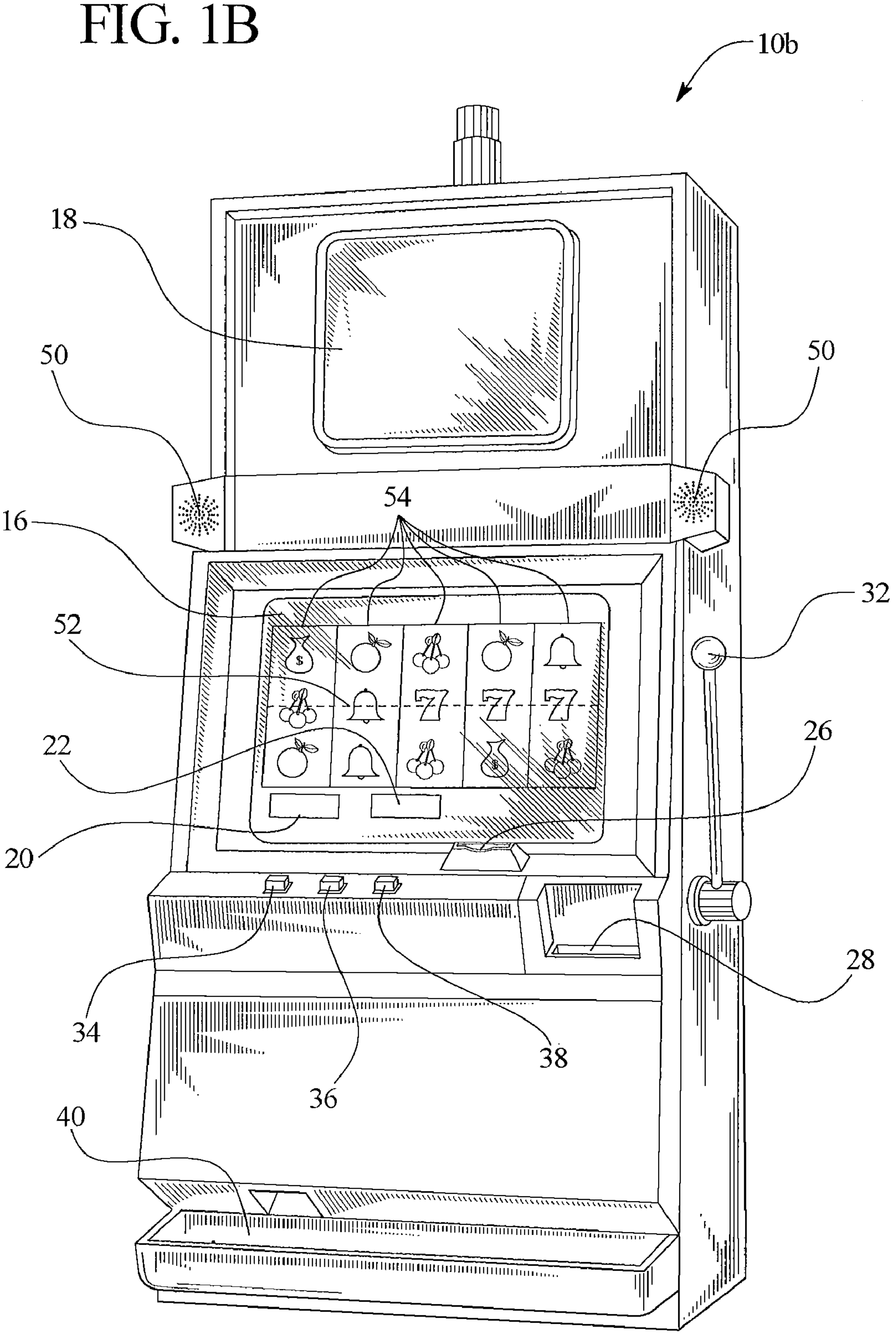

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
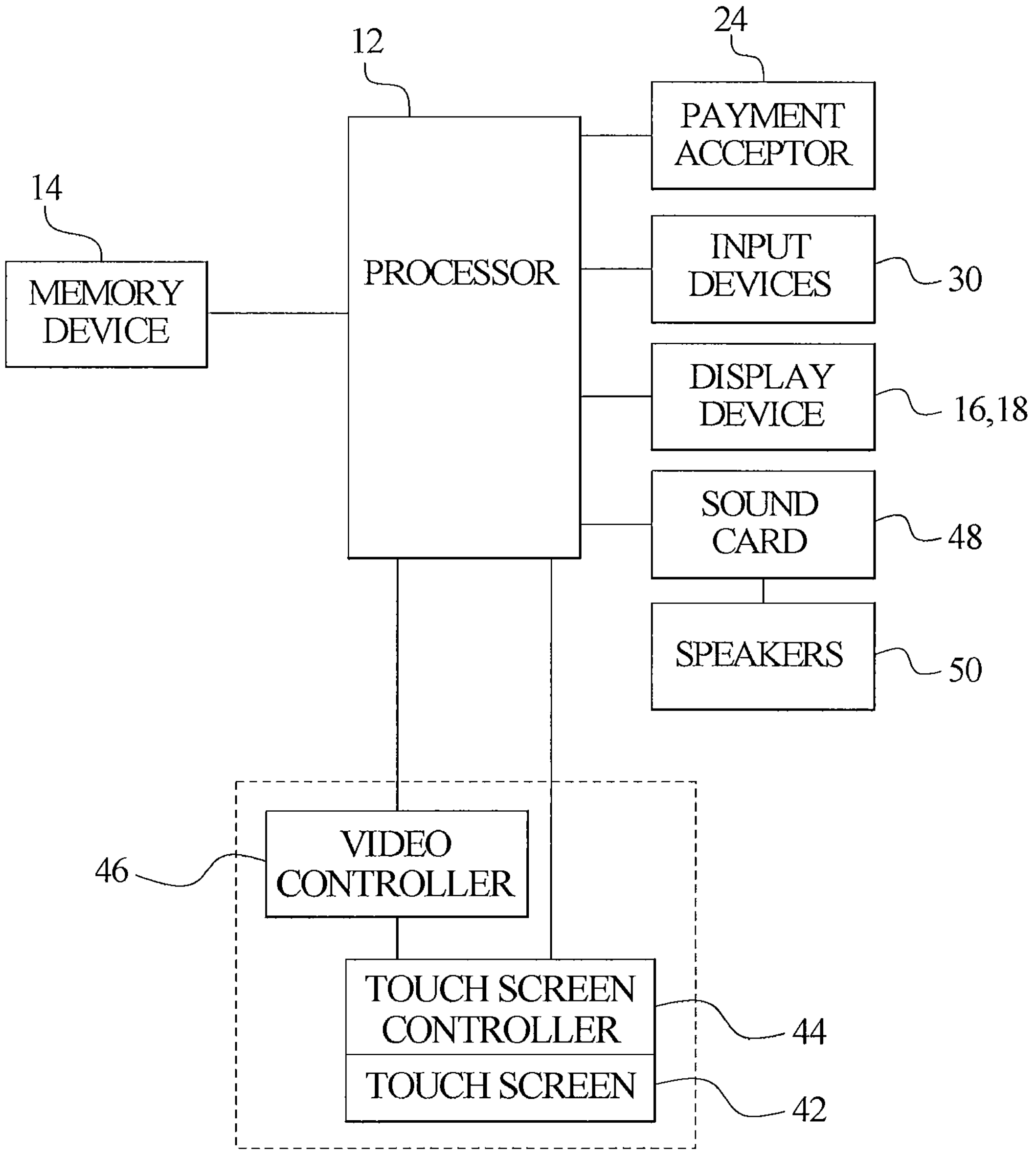
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software, for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
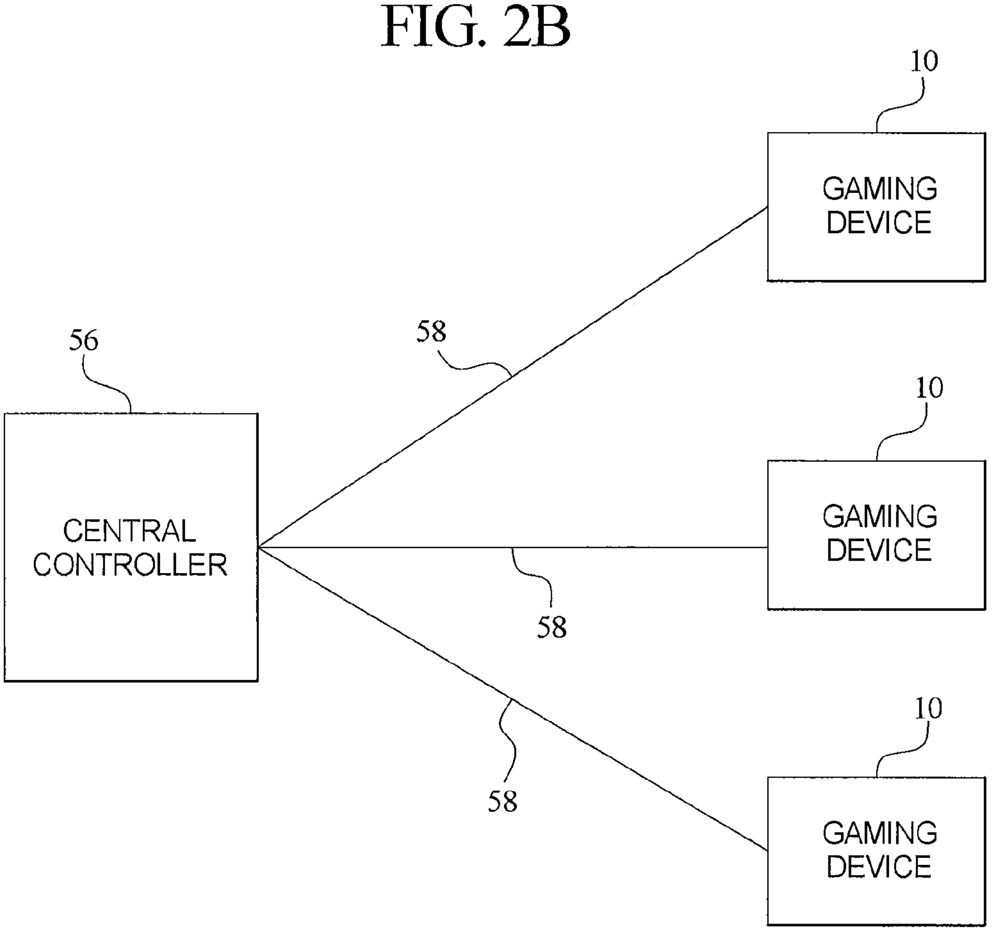
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one Internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an Internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Gaming Device Having Purchasable Enhanced Paytables

The present disclosure provides a gaming device and method having a paytable selection feature which may be implemented with a primary or base game, a secondary or bonus game, or both. In one embodiment, the gaming device includes a plurality of different paytables. The gaming device employs an initial one of the paytables and enables the player to pay for a different paytable to employ in a plurality of plays of the game. If the player chooses to select a different paytable, the gaming device determines a game outcome for each of a plurality of plays of the game and provides any awards based on the different paytable. If the player does not choose to select a different paytable, the gaming device determines any awards for those plays based on the initial paytable.

Figure 3:
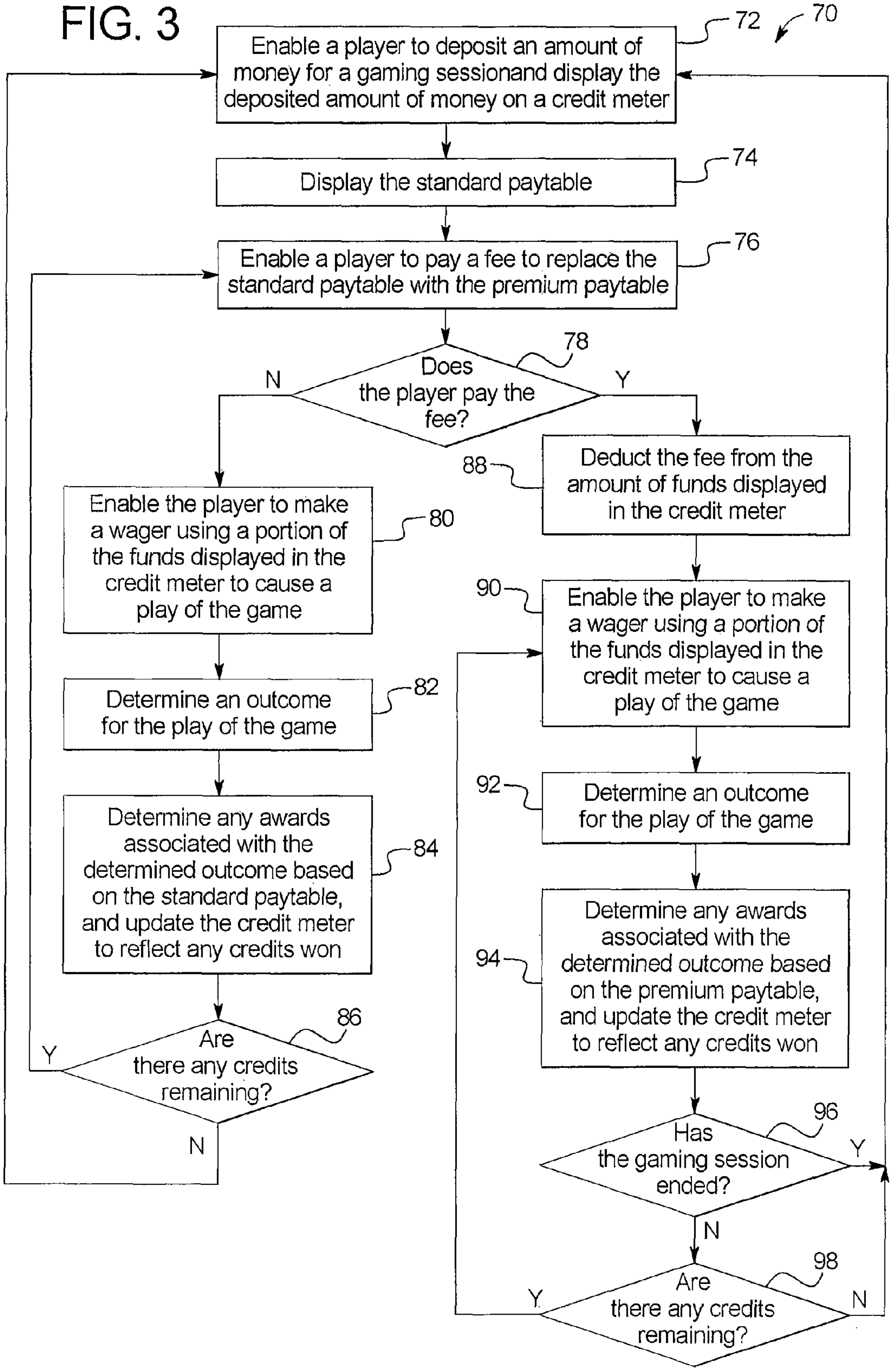
FIG. 3 is a process flow diagram showing one possible flow sequence of one embodiment of the present disclosure.

Referring now to FIG. 3, one embodiment of the present disclosure operates according to sequence 70. In one embodiment, the gaming device includes a standard paytable and a premium paytable. The gaming device enables the player to choose whether to play the game using the standard paytable or the premium paytable. In one such embodiment, the paytables are stored on the processor of the gaming device, and the gaming device enables the player to select one of the paytables. In another embodiment, the gaming device is in communication with a central server or central controller that maintains the plurality of paytables. In this embodiment, after the player selects a paytable to employ in the game, the central controller communicates the appropriate data to the gaming device, and the gaming device provides the paytable.

As indicated by block 72, the gaming device enables the player to deposit an amount of money into the gaming device to begin a gaming session. In one embodiment, when a player deposits money, the gaming device displays the amount on a credit meter or other suitable display. After receiving the money deposited by the player, the gaming device displays the standard paytable to the player, as indicated by block 74. In different embodiments, the standard paytable employed in the game may be predetermined, randomly determined, determined based on the player's wager, determined based on the player's status (via a player tracking system), determined based on a triggering event, determined based on time, or determined in any other suitable manner.

As indicated by block 76, in one embodiment, the gaming device enables the player to pay a fee to replace the standard paytable with the premium paytable. In another embodiment, the gaming device enables the player to choose a premium paytable from a list of choices. In one alternative embodiment, the gaming device enables the player to download a premium paytable or premium version of the game from a central server or controller in communication with the gaming device. In one embodiment, different players can be eligible for different paytables. In one such embodiment, eligibility for certain paytables is determined through a player tracking system. In one embodiment, players having different player status may qualify for different paytables.

In one embodiment, upgrading to a different paytable requires a certain number of player tracking points. In one such embodiment, the casino or game operator determines the number of points required to upgrade to a different paytable. In one such embodiment, different players have different redemption rates. In different embodiments, redemption rates are randomly determined, predetermined, determined based on a player's wager level, or determined in any other suitable manner.

In another embodiment, a player may use a certain amount of coupons to replace the standard paytable with the premium paytable. Such coupons are redeemable and offered to the general public as payment for purchasing premium paytables. For example, in a hotel affiliated with the gaming establishment, players receive coupons to play with premium paytables. In one embodiment, coupons may be provided to a player during the play of a game at a gaming device. Alternatively, coupons may be provided to a player as part of a special event or promotion relating to the casino. As a further alternative, coupons may be provided to a player by a brand-promoter, perhaps in connection with the sale of the good and/or service associated with the brand (for example, at a vending machine or a retail establishment) or as part of a mailing campaign. It should be appreciated that the fee for upgrading to a premium paytable may be paid using any suitable form of payment.

In one embodiment, the casino or game operator runs a promotion which enables players to play with the premium paytable. For example, the game operator may specify that for a number of days, such as the next two days, players can play with a premium paytable. It should be appreciated that the duration of and eligibility for such a promotion may be randomly determined, predetermined, determined based on time, determined based on wager level, or determined in any other suitable manner.

In one embodiment, the premium paytable gives the player an advantage in the game. In one embodiment, the gaming device displays the premium paytable to the player before the player makes the decision to purchase it. In one such embodiment, the premium paytable includes information highlighting or explaining any changes in the paytable to help players understand what they are getting in exchange for paying the fee. Thus, players can see the benefits of buying the premium paytable before paying the fee. Alternatively, the premium paytable may include benefits that are not readily evident to the player. In certain embodiments, the gaming device provides notices to the player throughout play of the game, indicating to the player how the player has benefited by playing with the premium paytable, or what the player could have won if the player had purchased the premium paytable.

For example, the premium paytable may provide one or more benefits over the standard paytable including: (i) a higher average expected payback, (ii) higher awards, (iii) higher awards for designated combinations, (iv) extra bonus events, (v) longer bonus events, (vi) more frequent bonus events, (vii) higher multipliers, (viii) random multipliers, (ix) more winning symbol combinations, (x) a different number of symbols; (xi) different types of symbols; (xii) different proportion and/or ordering of symbols; (xiii) different types of winning symbol combinations; (xiv) extra wild symbols, (xv) any other feature that provides the player with an advantage, or (xvi) any combination of these.

In one embodiment, the fee to buy the premium paytable is determined based on how much time a player must play using that paytable before the player begins to realize the benefits of the investment (i.e., the fee paid to purchase the new paytable). In one such embodiment, the game operator specifies the amount of time that the player must play before recouping the fee for a new paytable. In various alternative embodiments, the fee is determined based on other factors, such as a number of plays played by the player, a number of wagers placed by the player, the total amount wagered by the player, a number of previous wins, a number of previous losses, or any combination of these. For example, in one embodiment, if the player has had several previous wins in a gaming session, the fee to purchase the premium paytable is set at a higher price. If the player has had several previous losses, the fee to purchase the premium paytable is set at a lower price.

Referring again to FIG. 3, the gaming device determines whether the player pays the fee to purchase the premium paytable, as indicated by decision diamond 78. If the gaming device 10 determines that the player does not pay the fee, the gaming device 10 enables the player to make a wager using a portion of the funds displayed in the credit meter to cause a first play of the game, as indicated by block 80. The gaming device determines a game outcome for the play of the game, as seen by block 82. As illustrated by block 84, the gaming device determines any awards associated with the determined game outcome based on the standard paytable and updates the credit meter to reflect credits won by the player, if any.

After determining whether the player wins any awards based on the standard paytable, the gaming device determines whether the player has any credits remaining, as indicated by decision diamond 86. If the gaming device determines that the player has credits remaining, the gaming device enables the player to pay the fee to upgrade to the premium paytable and sequence 70 repeats beginning at block 76. Alternatively, the player may cash out any remaining credits and discontinue gaming. If the gaming device determines that the player has no more credits remaining, the gaming device enables the player to deposit an additional amount of money into the gaming device to initiate a new gaming session and sequence 70 begins again starting at block 72.

In one embodiment, if the player chooses not to pay the fee to purchase the premium paytable, the gaming device employs the standard paytable for a plurality of plays of the game. In one such embodiment, the player may, at any suitable time between each play of the game, pay the fee to upgrade to the premium paytable for a plurality of subsequent plays of the game.

Referring again to FIG. 3, if the gaming device 10 determines that the player has paid the fee to replace the standard paytable with the premium paytable, the gaming device 10 deducts the fee from the amount of funds displayed by the credit meter, as illustrated by block 88. In one embodiment, if the player chooses to place the fee to purchase the premium paytable, but the credit meter does not indicate that the player has deposited sufficient funds to cover the cost of the fee, the gaming device enables the player to deposit an additional amount of money into the gaming device. In another embodiment, the player charges the fee to a separate account.

In an alternative embodiment, the gaming device does not charge the player an upfront fee to purchase and subsequently play with the premium paytable. In one such embodiment, the gaming device enables the player to play with the premium paytable, and as the player plays and wins in the game, the gaming device keeps part of all of the player's winnings until the fee is paid off. In one such embodiment, the gaming device keeps the difference in the premium win over the standard win to pay off the fee for the premium paytable until the fee is paid off. In one embodiment, the gaming device includes a separate meter or marker which indicates to the player how much the player is in debt (i.e., how much of the fee still needs to be paid off). Once the fee has been paid off, the player is in regular premium or advantage play. In one embodiment, if the player loses everything, the player is not required to pay the fee.

As illustrated by block 90, after the gaming device receives the player's fee and deducts the fee from the credit meter, the gaming device 10 enables the player to make a wager using a portion of the remaining funds displayed in the credit meter to cause a play of the game. The gaming device 10 generates an outcome for the play of the game, as indicated by block 92. As seen by block 94, the gaming device determines any awards associated with the determined outcome based on the premium paytable and updates the credit meter to reflect the credits won by the player, if any.

After determining any awards to provide to the player, the gaming device determines, as indicated by decision diamond 96, whether the gaming session has ended. If the gaming session has ended, the gaming device enables the player to begin another gaming session by depositing an amount of money, as indicated by block 72.

If the gaming session has not ended, the gaming device determines, as indicated by decision diamond 98, whether there are any credits remaining. In one embodiment, if the gaming device determines that the player has credits remaining, the player has the opportunity to wager another amount to play the game at least one more time with the premium paytable, as indicated by block 90.

In one embodiment, the player may continue playing with the premium paytable until the gaming session ends or until the credit meter reaches zero (i.e., there are no more credits remaining). In certain embodiments, the gaming session ends when an amount of time has elapsed, when the player has run out of a provided number of plays with the premium paytable, when the player has wagered a designated amount, or after any other suitable event. It should be appreciated that, at any time between plays of the game, the player may cash out any remaining credits and discontinue gaming.

If the gaming device determines that the player has no credits remaining, as indicated by decision diamond 98, the gaming device enables the player to deposit an amount of money to initiate another gaming session and sequence 70 begins again starting at block 72.

In one embodiment, when the player has no credits remaining in the gaming session, the gaming device provides a limited amount of time within which the player may deposit an additional mount of money to extend the gaming session. In one such embodiment, if the player deposits the additional amount of money within the provided amount of time, the gaming device enables the player to continue playing with the premium paytable. If the provided amount of time elapses and the player has not deposited any additional funds to continue the gaming session, the gaming device determines that the player has left the gaming device and reverts back to standard play. Thus, if another player approaches the gaming device to initiate a gaming session, that player must pay a fee to replace the standard paytable with a premium paytable.

In certain embodiments, a player begins a gaming session by inserting a playing tracking card, providing a pin code, or identifying himself or herself in any other suitable manner. The gaming device tracks the player's gaming activity at the gaming device and identifies whether has chosen to pay the fee to play with the premium paytable for that gaming session. In one such embodiment, once a player is identified as a premium player, the gaming device enables the player to continue playing with the premium paytable until the player removes the player tracking card. In one embodiment, if the premium player moves from one gaming device where the player was playing with a premium paytable to a different gaming device, the moved-to gaming device enables the player to continue playing with the premium paytable. Alternatively, if the player moves to a different gaming device, the player must pay an additional fee at the moved-to gaming device to purchase and play with the premium paytable at that gaming device.

Referring now to FIG. 4A, one example embodiment of the gaming device of the present disclosure offers a standard paytable having an average expected payout of 90% and a premium paytable having an average expected payout of 95%. The table of FIG. 4A shows the expected win values for a playing with the standard paytable and a player playing with the premium paytable. The values of the win amounts are determined based on the average expected payout associated with the paytable. It should be appreciated that the average expected payouts of the paytables can be adjusted as desired by the game operator.

As indicated in the table of FIG. 4A, a player who pays the fee to replace the standard paytable with the premium paytable starts with an initial loss of 10 dollars at the beginning of game play. This initial loss represents the fee to play with the premium paytable. In this example, the player will not realize the benefits of the premium paytable until the player has recouped the 10 dollars spent to purchase the premium paytable.

In one embodiment, the player must play, on average, up to a cross point to recoup the fee paid for the premium paytable. The cross point represents the point in time where, on average, the player has recouped the fee and is now purely playing with a paytable that gives the player an advantage in the games. In the example of FIG. 4A, the cross point occurs when the player has wagered $200. It should be appreciated that, if a player is playing slower or faster than an average player, it will take them less time or more time, respectively, to reach the cross point (i.e., to wager $200). After playing long enough to wager $200, and therefore, reach the cross point, the player will begin to realize the benefits of the premium paytable.

It should be appreciated that the cross point is a theoretical cross point. That is, players may recoup the cost of the fee before or after the theoretical cross point. For example, a player who purchases the premium paytable could have a big win in the first play of the game employing the premium paytable and recoup the cost of the fee in this first play of the game. In this case, the player reaches the actual cross point (i.e., has recouped the cost of the fee) after only one play of the game and immediately enters premium or advantage play.

Figure 4B:
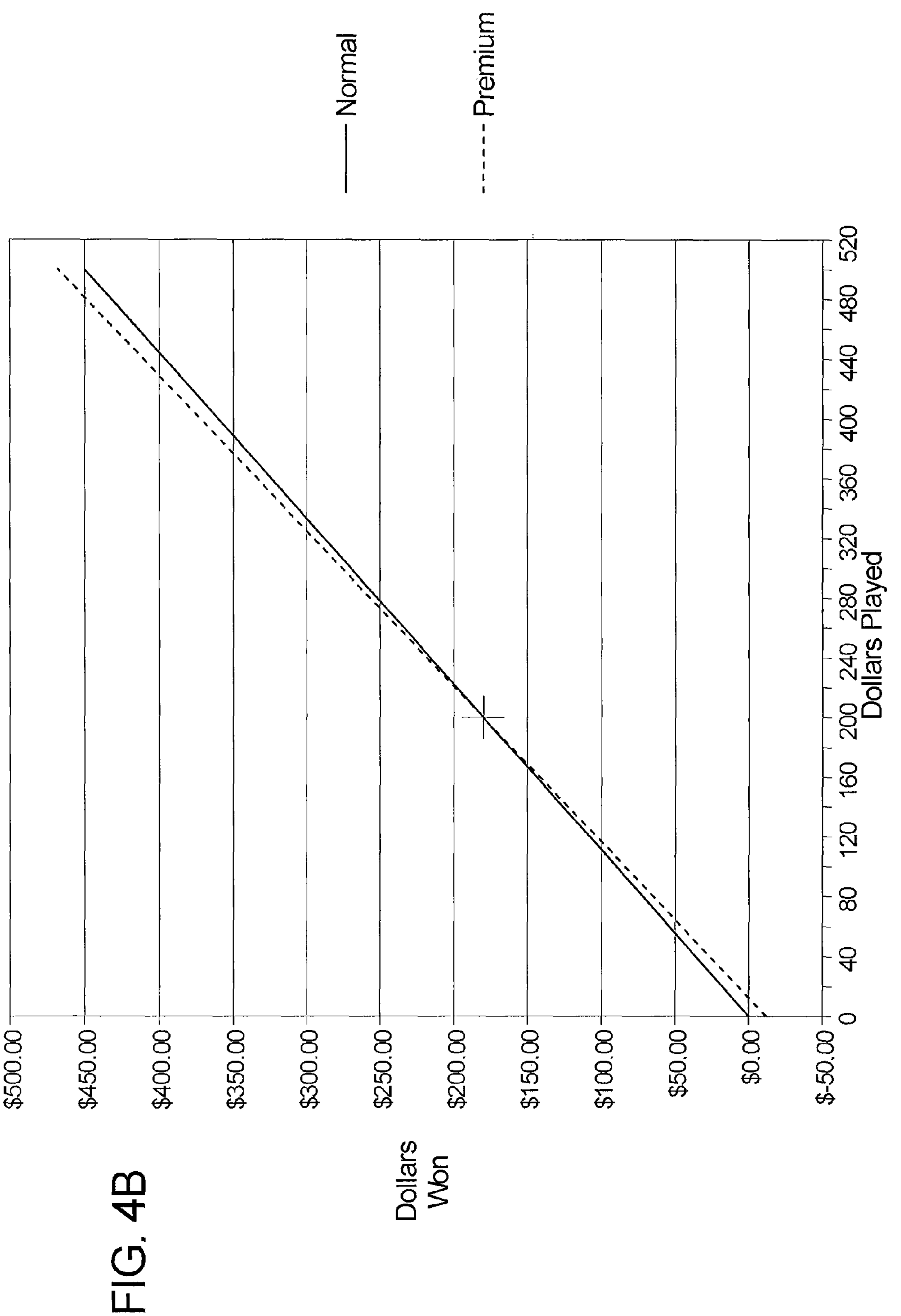
FIG. 4B is a graphical representation of the data of FIG. 4A.

The cross point can be seen visually in the graph of FIG. 4B. A player who does not play up to the cross point loses more money than if they had not played on the premium paytable. When each of the players has wagered $200, the average expected amount won, on average, is the same for both the standard paytable and the premium paytable. After the reaching cross point, a significant advantage in monies won can be seen by the player playing with the premium paytable. As illustrated in FIG. 4B, the slope of the win line is more steep for the player playing with the premium paytable than that of the player playing with the standard paytable.

A player who plays long enough to reach the cross point, recoups the cost of buying the premium paytable. After recouping this upfront cost, the player may continue playing at the gaming device to get the most out of their investment in or purchase of the premium paytable. Although the player is playing with the premium paytable, continued play is beneficial to the game operator. The average expected payback of the premium paytable is lower than 100%. Thus, getting the player to play at the gaming device for a longer period of time, even with a higher paying paytable, is profitable for the game operator.

In one embodiment, once the player reaches the cross point, the player may play an unlimited number of plays of the game with the premium paytable. In such an embodiment, the number of plays of the game is limited only by a player's decision to end the gaming session. Alternatively, once the player reaches the cross point, the player can play a further predetermined number of plays of the game with the premium paytable. In another embodiment, there is a maximum award amount up to which the player can play with the premium paytable. In this embodiment, the player can play the game with the premium paytable until the player has won the maximum possible amount.

Referring now to FIG. 5A, in one example embodiment, the gaming device offers a standard paytable having an average expected payout of 88%, a premium paytable having an average expected payout of 91%, and a golden paytable having an average expected payout of 95%. The win values for each paytable are determined based on the average expected payout associated with that paytable and the fee paid, if any, to play with that paytable.

As seen in the table of FIG. 5A, a player playing with the premium paytable starts with an initial $10 loss. A player playing with the golden paytable starts with an initial $20 loss. Therefore, if a player wagers 100 dollars, the player has an expected return of 88 dollars if playing with the standard paytable, an expected return of 81 dollars if playing with the premium paytable and an expected return of 75 dollars if playing with the golden paytable. The players playing with the premium and golden paytables have not yet recouped the upfront fee paid to play with the higher paying paytables. Thus, after wagering 100 dollars, the players playing with the premium and golden paytables do not have an expected return that is as high as the player playing with the standard paytable.

As discussed above, the player recoups the cost of the fee to purchase a different paytable when the player reaches the cross point. In FIG. 5A, the cross point between a player playing with a standard paytable and a player playing with a premium paytable is at around $320. The cross point between a player playing with a premium paytable and a player playing with a golden paytable is at around $260.

Figure 5B:
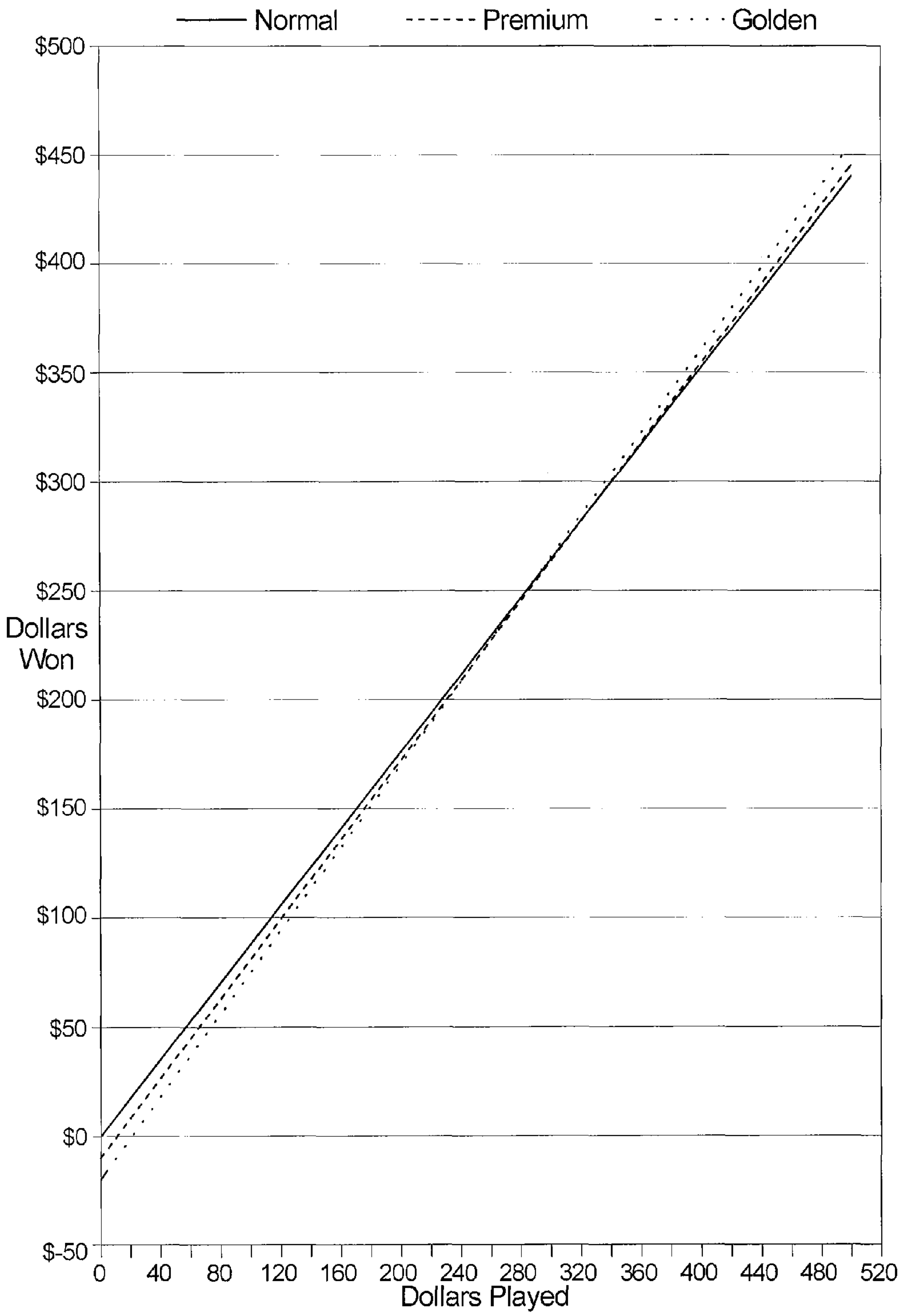
FIG. 5B is a graphical representation of the data of FIG. 5A.

These cross points can be seen in the graph of FIG. 5B. The slope of the win line of the premium player is more steep than the slope of the win line of the standard player. The slope of the win line of the golden player is more steep than both the slope of the win line of the standard and premium players. After reaching the cross point, players who play for longer amounts of time will realize more benefits from playing with the higher paytables.

As discussed above, the paytable selection feature of the present disclosure may be implemented in a primary or base game, a secondary or bonus game, or both. In one embodiment, the present disclosure is applied to a secondary or bonus game, which is played in combination with a base or primary game. In one such embodiment, the gaming device enables the player to place a wager to cause a play of the primary game. In one example, if the player places the wager, the gaming device employs the standard paytable in the secondary game and determines a secondary game outcome on the standard paytable. If the player pays the fee, the gaming device employs the premium paytable in the secondary game and determines the secondary game outcome based on the premium paytable. It should be appreciated that, if the player chooses to pay the fee to purchase the premium paytable, the premium paytable is employed in the secondary or bonus game when the secondary or bonus game is triggered, such as by a suitable bonus triggering event in the primary or base game.

In one embodiment, the premium play feature of the present disclosure is implemented in a server based environment. In one such embodiment, a central server, central controller, or remote host is in communication with or linked to a plurality of gaming machines or gaming devices. In one embodiment, each of the linked gaming devices includes one or a plurality of primary games, wherein each of the games is associated with a paytable. In one embodiment, each of the gaming devices in the gaming system is enabled to participate in premium play.

It should be appreciated that the individual paytables of the gaming devices are not associated with the premium play. In this embodiment, the central server pays the premium awards as opposed to the paytable of each gaming device in the gaming system. In one embodiment, the central controller or server maintains a pool which is used to provide the increased or premium awards associated with premium play. In this embodiment, the premium awards are paid through the pool maintained by the central server, rather than through the individual paytables of the gaming devices.

In one embodiment, each player playing at a gaming device in the gaming system pays a fee to participate in premium play. In one such embodiment, the each of the fees paid by the players are allocated to the pool. In another embodiment, a portion or percentage of each fee is allocated to the pool. In one embodiment, a portion or percentage of each fee is kept by the casino or game operator as commission.

In one embodiment, the central server monitors the wins that occur at each of the gaming devices participating in premium play. Each time a win under a threshold amount occurs, the central server allocates a percentage of that win to the premium pool. In one embodiment, the percentage of the win that is allocated to the pool is equal to the difference between the average expected payout of the standard paytable and the average expected payout of the premium paytable. When a win above the threshold amount occurs, the central server awards the premium pool to the player who triggered the win. In different embodiments, the threshold amount is predetermined, randomly determined, determined based on wager level, or determined in any other suitable manner.

In one example embodiment, a premium paytable is associated with a 95% average expected payback and a standard paytable is associated with a 90% average expected payback. There is a 5% difference in average expected payback between the 95% paytable and the 90% paytable. In this example, the pool maintained by the central server funds the 5% increase in average expected payback associated with the premium paytable.

Player A and Player B each pay an upfront fee of $10 to purchase the premium paytable, and the entire fee from each player is allocated to the pool maintained by the central server. At this point, the premium pool has a value of $20.00 (i.e., $10 from Player A+$10 from Player B). In this example, the threshold amount associated with the triggering event is $200. Any win below $200 is allocated to the pool at a contribution rate of 5%. In other words, 5% of any win below the threshold amount of $200 is allocated to the pool. Any win above $200 is a triggering event which causes the central control to award the pool to the player who triggered the win above $200.

Player A has a first win of $100, and Player B has a first win of $80. The gaming devices communicate this information to the central server. Since both of these wins are under the threshold amount of $200, 5% of each win is allocated to the pool. Thus, the value of the pool is incremented by $5.00 for Player A's win and $4.00 for Player B's win. The value of the pool is now $29.00. In one embodiment, the player has no knowledge that a portion of the wins are funded into the pool. In another embodiment, the player may be provided with appropriate messaging, such as "Your win has increased the premium pool. Get a win over $200 to win the premium pool."

Player B has the next win of $250. The gaming device communicates this information to the server. The win is above the threshold amount of $200, and therefore, the central server provides the pool to Player B. In one embodiment, the pool is incremented by an additional $12.55 for Player B's win of $250 and Player B is provided a premium payout of $41.50 (i.e., $12.50+the $29.00 previously in the pool) in addition to Player B's $250 win for a total of $291.50. In another embodiment, the pool is not incremented based on 5% of the $250 win since Player B receives the pool (and Player B is provided a premium payout of $29.00 in addition to the $250, for a total of $279.00). In one such embodiment, the $12.50 is applied to a next premium pool. Thus, the central server awards Player B the difference between the win on a premium paytable and the win on the standard paytable without requiring any knowledge of the individual paytables employed by the gaming devices in the gaming system.

While the present disclosure is described in connection with what is presently considered to be the most practical and preferred embodiments, it should be appreciated that the present disclosure is not limited to the disclosed embodiments, and is intended to cover various modifications and equivalent arrangements included within the spirit and scope of the claims. Modifications and variations in the present disclosure may be made without departing from the novel aspects of the invention as defined in the claims, and this application is limited only by the scope of the claims.

The invention is claimed as follows:

1. A method of operating a gaming system, said method comprising:

(a) causing at least one processor to operate with at least one input device and at least one display device to enable a player to pay a fee to replace a first paytable with a second different paytable for a quantity of plays of a game, said quantity including at least two plays of said game, said fee being in addition to credits placed on each said play of the game, said first paytable having a plurality of different outcomes and a first plurality of awards respectively associated with said outcomes, said second different paytable having a same plurality of different outcomes and a second plurality of awards respectively associated with said outcomes, wherein, for a same amount of credits placed on the play of the game, for at least one of said outcomes, the second paytable has a different award associated with said outcome than the first paytable;

(b) causing the at least one processor to operate with the at least one input device and the at least one display device, if the player does not pay the fee, for each of said plays of the game in said quantity, to:

(i) determine a game outcome for said play of the game, (ii) display the determined game outcome for said play of the game, and (iii) display any award associated with said determined game outcome based on the first paytable; and (c) causing the at least one processor to operate with the at least one input device and the at least one display device, if the player pays the fee, for each of said plays of the game in said quantity, to:

(i) determine a game outcome for said play of the game, (ii) display the determined game outcome for said play of the game, and (iii) display any award associated with said determined game outcome based on the second different paytable.

2. The method of operating a gaming system of claim 1, wherein an average expected award of the second different paytable is greater than an average expected award of the first paytable.

3. The method of operating a gaming system of claim 1, which includes causing the at least one processor to operate with the at least one display device to display the first paytable prior to the receiving the fee.

4. The method of operating a gaming system of claim 3, which includes causing the at least one processor to operate with the at least one display device to display the second different paytable prior to the receiving the fee.

5. The method of operating a gaming system of claim 1, wherein said quantity of plays of the game includes one of: (a) a predetermined number of plays of the game; and (b) a number of plays of the game in a designated amount of time.

6. The method of operating a gaming system of claim 1, wherein the credits are not redeemable for cash by the player.

7. The method of operating a gaming system of claim 1, which is provided through a data network.

8. The method of operating a gaming system of claim 7, wherein the data network is an internet.

9. The method of operating a gaming system of claim 7, wherein said plurality of instructions, when executed by the at least one processor, cause the alternative paytable to be at least in part selected by the player.

10. A method of operating a gaming system, said method comprising:

(a) causing at least one processor to operate with at least one input device and at least one display device to enable a player to pay a fee to replace a first paytable with a second different paytable for a quantity of plays of a game, said quantity including at least two plays of said game, said fee being in addition to credits placed on each said play of the game, the second different paytable providing at least one advantage over the first paytable, said at least one advantage selected from a group consisting of:

(i) a higher award for a same outcome, (ii) a higher multiplier, (iii) a different number of winning symbol combinations, (iv) a different type of winning symbol combination, (v) a different quantity of symbols, (vi) different types of symbols, (vii) a different proportion symbols, and (viii) a different ordering of symbols;

(b) causing the at least one processor to operate with the at least one input device and the at least one display device, if the player does not pay the fee, for each of said plays of the game in said quantity, to:

(i) determine a game outcome for said play of the game, (ii) display the determined game outcome for said play of the game, and (iii) display any award associated with said determined game outcome based on the first paytable; and (c) causing the at least one processor to operate with the at least one input device and the at least one display device, if the player pays the fee, for each of said plays of the game in said quantity, to:

(i) determine a game outcome for said play of the game, (ii) display the determined game outcome for said play of the game, and (iii) display any award associated with said determined game outcome based on the second different paytable.

11. The method of operating a gaming system of claim 10, wherein an average expected award of the second different paytable is greater than an average expected award of the first paytable.

12. The method of operating a gaming system of claim 11, which includes causing the at least one processor to operate with the at least one display device to display the first paytable prior to receiving the fee.

13. The method of operating a gaming system of claim 12, which includes causing the at least one processor to operate with the at least one display device to display the second different paytable prior to receiving the fee.

14. The method of operating a gaming system of claim 11, wherein said quantity of plays of the game includes one of: (a) a predetermined number of plays of the game; and (b) a number of plays of the game in a designated amount of time.

15. The method of operating a gaming system of claim 10, wherein the credits are not redeemable for cash by the player.

16. The method of operating a gaming system of claim 10, which is provided through a data network.

17. The method of operating a gaming system of claim 16, wherein the data network is an internet.

18. A method of operating a gaming system, said method comprising:

(a) causing at least one processor to operate with at least one input device and at least one display device to associate a game with a plurality of different paytables, said plurality of different paytables including an initial paytable and a plurality of alternative paytables, each of said plurality of different paytables having an average expected award for each play of the game;

(b) causing the at least one processor to operate with the at least one input device to receive a fee from a player to cause a selection of one of the alternative paytables for a play of the game, said fee being in addition to any credits placed on said play of the game;

(c) causing the at least one processor to operate with the at least one display device, if the fee is not received, to employ the initial paytable to determine and display any award associated with an outcome for said play of the game; and (d) causing the at least one processor to operate the at least one display device, if said fee is received, to select one of the alternative paytables, and employ said selected one of the alternative paytables to determine and display any award associated with the outcome for said play of the game.

19. The method of operating a gaming system of claim 18, wherein an average expected award of the each alternative paytable is greater than an average expected award of the initial paytable.

20. The method of operating a gaming system of claim 18, which includes causing the at least one processor to operate with the at least one display device to display the initial paytable.

21. The method of operating a gaming system of claim 18, which includes causing the at least one processor to operate with the at least one display device to display the alternative paytables prior to receiving the fee.

22. The method of operating a gaming system of claim 18, wherein said plurality of instructions, when executed by the at least one processor, cause the alternative paytable to be at least in part randomly selected.

23. The method of operating a gaming system of claim 18, wherein the credits are not redeemable for cash by the player.

24. The method of operating a gaming system of claim 18, which is provided through a data network.

25. The method of operating a gaming system of claim 24, wherein the data network is an internet.

* * * * *

UNITED STATES PATENT AND TRADEMARK OFFICE
CERTIFICATE OF CORRECTION

PATENT NO. : 8,177,627 B2
APPLICATION NO. : 12/816129
DATED : May 15, 2012
INVENTOR(S) : Anthony J. Baerlocher It is certified that error appears in the above-identified patent and that said Letters Patent is hereby corrected as shown below:

IN THE CLAIMS

In Claim 9, Column 32, Line 9, replace “7” with --18--.
In Claim 9, Column 32, Lines 10 to 11, delete “said plurality of instructions, when executed by the at least one processor, cause”.
In Claim 9, Column 32, Line 11, replace “to be” with --is--.
In Claim 10, Column 32, Line 24, replace “a” with --the--.
In Claim 10, Column 32, Line 32, between “proportion” and “symbols” insert --of--.
In Claim 18, Column 33, Line 27, between “operate” and “the” insert --with--.
In Claim 19, Column 34, Line 6, replace “an” with --the-- and delete “the”.
In Claim 19, Column 34, Line 7, replace “an” with --the--.
In Claim 22, Column 34, Lines 18 to 19, delete “said plurality of instructions, when executed by the at least one processor, cause”.
In Claim 22, Column 34, Line 19, replace “to be” with --is--.

Signed and Sealed this
Twenty-third Day of October, 2012

David J. Kappos
*Director of the United States Patent and Trademark Office*